United States Patent
Axakov et al.

(10) Patent No.: US 9,061,617 B2
(45) Date of Patent: Jun. 23, 2015

(54) THIN VENTILATED SEAT FOR A VEHICLE AND ITEMS OF FURNITURE

(75) Inventors: Dmitri Axakov, Windsor (CA); Raghvendra Trimbakrao Joshi, Windsor (CA); Lizhuo Zhang, Windsor (CA); Dieter Barthel, Rodenbach (DE); Jochen Michelmann, Gelnhausen (DE)

(73) Assignee: IGB Automotive Ltd., Ontarion (CA)

( * ) Notice: Subject to any disclaimer, the term of this patent is extended or adjusted under 35 U.S.C. 154(b) by 395 days.

(21) Appl. No.: 13/472,574

(22) Filed: May 16, 2012
(Under 37 CFR 1.47)

(65) Prior Publication Data

US 2012/0315132 A1 Dec. 13, 2012

Related U.S. Application Data

(60) Provisional application No. 61/486,878, filed on May 17, 2011.

(51) Int. Cl.
*B60N 2/56* (2006.01)

(52) U.S. Cl.
CPC ............. *B60N 2/565* (2013.01); *B60N 2/5642* (2013.01); *B60N 2/5635* (2013.01); *B60N 2/5657* (2013.01)

(58) Field of Classification Search
CPC ...... A47C 7/74; B60N 2/5642; B60N 2/5657; B60N 2/565; B50N 2/5635

USPC ...................................................... 297/180.14
See application file for complete search history.

(56) References Cited

U.S. PATENT DOCUMENTS

| | | | |
|---|---|---|---|
| 7,261,371 B2* | 8/2007 | Thunissen et al. ... | 297/180.14 X |
| 7,370,911 B2* | 5/2008 | Bajic et al. ............... | 297/180.14 |
| 7,478,869 B2* | 1/2009 | Lazanja et al. ........... | 297/180.14 |
| 7,931,330 B2* | 4/2011 | Itou et al. ................. | 297/180.14 |
| 2006/0175877 A1* | 8/2006 | Alionte et al. ....... | 297/180.14 X |
| 2011/0133525 A1* | 6/2011 | Oota .................... | 297/180.14 X |

* cited by examiner

*Primary Examiner* — Anthony D Barfield
(74) *Attorney, Agent, or Firm* — Fildes & Outland, P.C.

(57) ABSTRACT

An air conditioning unit includes a shaped body forming at least one part of a seat cushion. The shaped body has a seating surface and an opposite lower side. An air flow module is arranged at the lower side of the shaped body. The air flow module includes an air mover and has an air inlet opening and an air outlet opening. The shaped body has at least one air through-hole extending from the seating surface to the air flow module. The air flow module is in fluid communication with the at least one air through-hole in the shaped body. At least one channel extends in a radial direction adjacent the lower surface of the shaped body. The air flow module is in fluid communication with the at least one channel, and provides airflow between the seating surface of the shaped body and the at least one channel.

13 Claims, 12 Drawing Sheets

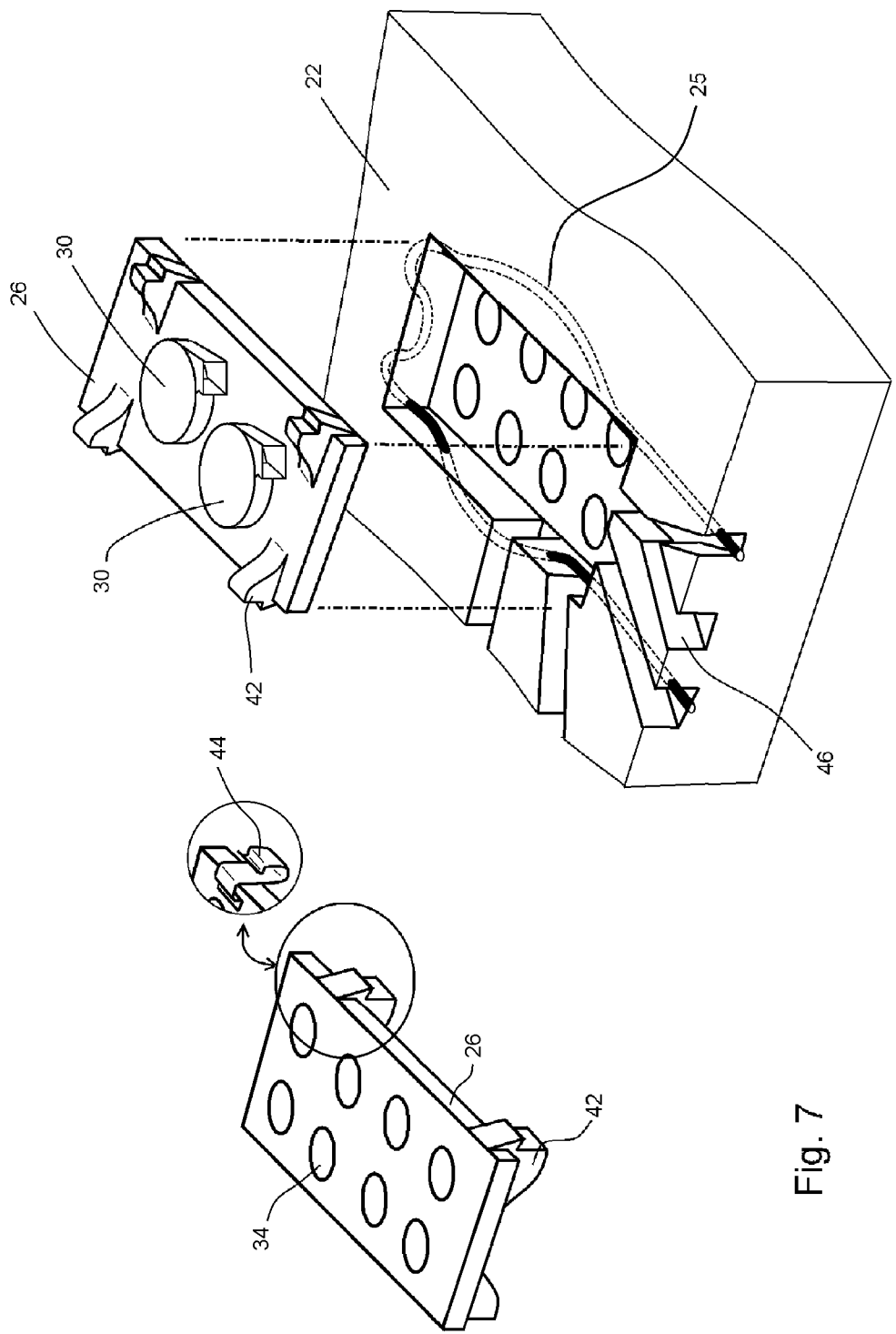

THIN VENTILATED SEAT FOR A VEHICLE AND ITEMS OF FURNITURE

CROSS REFERENCE TO RELATED APPLICATION

This application claims the priority of U.S. Provisional Application No. 61/486,878 filed May 17, 2011.

TECHNICAL FIELD

The invention relates to ventilated seats for vehicles, specifically to seats mounted over air impermeable solid surfaces or walls such as sedan rear seat, pickup seat, or seats for public transportation; and seats in public places such as cinemas, theaters, etc.

BACKGROUND OF THE INVENTION

So far the most commercially viable seat ventilation systems have been developed for front car seats. One of the reasons is that at least one of the front seats, specifically the driver seat, is always occupied. The driver is also typically the person who buys the vehicle. Another reason is the relative ease of front seat ventilation. That is, normally there is a space under the seat where the necessary air mover and its breathing passage may be arranged. Also, the seat back of a front seat normally has a three-dimensional metal frame for handling minor collision forces and more or less surplus space is available inside. It simplifies the system fitting. Such front vehicle seats may have two variants, i.e., with the ventilation or without the ventilation option, with the seat dimensions being the same in both cases.

In contrast, rear seats are typically left unventilated in many cars. The reason is that such seats are not "ventilation-friendly" in many cars. The typical rear seat construction is simply foam padding placed over an air impermeable base structure such as the vehicle profiled floor or the rear vehicle occupant compartment wall having an angled or inclined disposition. The foam thickness is minimal and adding an air mover and its breathing passage would require changing of the so called H-point, which is the seat surfaces designed locations. If the ventilation components are placed inside the bolsters, then the H-point may stay intact but the bolster cushioning function is reduced. In any event, rear seat ventilation causes safety concerns, and it is conventionally necessary to allow room for it in the very early stage of the vehicle design, before or during the time at which the body shape is determined.

Similar problems exist in furniture seating. For example, conventional seat ventilation systems are too bulky to be hidden in home or office style chairs.

SUMMARY OF THE INVENTION

The present invention provides a ventilated seat that minimizes vehicle rear seat ventilation system impact to the vehicle body design and in some cases allows for the fitting of the system into existing car rear seats.

The present invention may include the following. An air mover is placed in between the seat foam padding and the seat solid impermeable base. The air mover may be made as an air mover having a main plate and suction vents in the plate. Blowers or open impellers are installed behind the plate. The air mover may have a single discharge zone or a plurality of air discharge vents located on the air mover peripheral zone and capable of dispersing the air in the planar direction, in various points around the tray perimeter or its fragment.

More particularly, an air conditioning unit in accordance with the present invention includes a shaped body forming at least one part of a seat cushion. The shaped body has a seating surface that faces an occupant of the seat and a lower side that faces away from an occupant of the seat, and the shaped body is supported by a seat support surface. An air flow module is arranged at the lower side of the shaped body. The air flow module includes an air mover and has an air inlet opening and an air outlet opening. The shaped body has at least one air through-hole extending from the seating surface to the air flow module. The air flow module is in fluid communication with the at least one air through-hole in the shaped body. At least one channel extends in a radial direction and is adjacent the lower surface of the shaped body. The air flow module is in fluid communication with the at least one channel. The air mover provides airflow between the seating surface of the shaped body and the at least one channel.

The at least one channel may be generally parallel to the support surface. Each of the at least one channel may be one of a groove formed in the lower side of the shaped body, a passageway defined by the lower side of the shaped body and contours in the support surface, and a groove formed in the lower side of the shaped body in combination with contours in the support surface. The contours in the support surface may include one or more of technological voids, grooves, and orifices formed in the support surface.

The air inlet opening may be connected to the at least one through-hole in the shaped body, the air outlet opening may be connected to the at least one channel, and the air flow module may draw air from the seating surface to the at least one channel. Alternatively, the air inlet opening may be connected to the at least one channel, the air outlet opening may be connected to the at least one through-hole in the shaped body, and the air flow module may draw air from the at least one channel to the seating surface.

In one embodiment, an air conditioning unit in accordance with the present invention includes a shaped body forming at least one part of a seat cushion. The shaped body has a seating surface that faces an occupant of the seat and a lower side that faces away from an occupant of the seat. The shaped body is supported by a support surface. An air conditioning module is arranged at the lower side of the shaped body. The shaped body has at least one air through-hole extending from the seating surface to the air conditioning module. The air conditioning module includes an air inlet compartment and an air outlet compartment. Each compartment has a bottom surface, a top surface and side walls. The compartments are separated from each other by a partition wall that is formed at a location of the side walls. Each partition wall includes at least one opening therein. The air conditioning module includes at least one air mover. Each air mover has a housing with an axial air inlet opening and a radial air outlet opening. Each air mover is mounted in the air conditioning module such that the axial air inlet opening is in fluid communication with the air inlet compartment and the radial air outlet opening is in fluid communication with the air outlet compartment. At least one channel extends in a radial direction adjacent the lower surface of the shaped body, and is in fluid communication with the air conditioning module. The at least one air mover provides airflow between the seating surface of the shaped body and the at least one channel.

The at least one channel may be generally parallel to the support surface. Each of the at least one channel may be one of a groove formed in the lower side of the shaped body, a passageway defined by the lower side of the shaped body and contours in the support surface, and a groove formed in the lower side of the shaped body in combination with contours in the support surface. The contours in the seat support surface may include one or more of technological voids, grooves, and orifices formed in the support surface.

The air inlet compartment may be connected to the at least one air through-hole in the shaped body, and the air outlet compartment may be connected to the at least one channel, such that the air conditioning module draws air from the seating surface to the at least one channel. Alternatively, the air inlet compartment may be connected to the at least one channel, and the air outlet compartment may be connected to the at least one air through-hole in the shaped body, such that the air conditioning module draws air from the at least one channel to the seating surface.

In a specific embodiment, an air conditioning unit in accordance with the present invention includes a shaped body forming at least one part of a seat cushion. The shaped body has a seating surface that faces an occupant of the seat and a lower side that faces away from an occupant of the seat. An air conditioning module is arranged at the lower side of the shaped body. The air conditioning module has at least one blower fan each including a blower housing with an axial air inlet opening and a radial air outlet opening. The shaped body has at least one air through-hole extending from the seating surface to the air conditioning module. Characterized in that the air conditioning module comprises at least one air inlet compartment and at least one air outlet compartment, each compartment has a bottom surface, a top surface and side walls, and the compartments are separated from each other by a partition wall that is formed at a location of the side walls, the at least one blower fan is mounted in the air conditioning module such that the blower housing is in fluid communication with at least one opening in the partition wall, the blower fan drawing air from the air inlet compartment and emitting the air to the air outlet compartment via the radial air outlet opening, at least one opening in the top surface of the air inlet compartment that is in fluid communication with the at least one air through-hole in the shaped body, and at least one channel that extends in a radial direction and is in fluid communication with the air conditioning module, wherein the air drawn into the air conditioning module from the through-holes in the shaped body is injected into the at least one channel.

The at least one channel may be generally parallel to a support surface of the shaped body. Each of the at least one channel may be one of a groove formed in the lower side of the shaped body, a passageway defined by the lower side of the shaped body and contours in a support surface of the shaped body, and a groove formed in the lower side of the shaped body in combination with contours in a support surface of the shaped body. The contours in the support surface of the shaped body may include one or more of technological voids, grooves, and orifices formed in the support surface.

The air conditioning module may include a plurality of openings peripherally, radially disposed. The plurality of openings may be disposed in one or more side walls of the air outlet compartment. The plurality of openings may be in fluid communication with the at least one channel.

In another embodiment, an air conditioning unit in accordance with the present invention includes a shaped body forming at least one part of a seat cushion. The shaped body has a seating surface that faces an occupant of the seat and a lower side that faces away from an occupant of the seat. The lower side includes a recess having a sidewall extending from the lower side. A retaining wire is disposed in the shaped body between the seating surface and lower side and partially extends through the sidewall into the recess. An air flow module is mounted in the recess at the lower side of the shaped body and retained therein by the part of the retaining wire extending through the sidewall.

The air flow module may include one or more connectors that attach the air flow module to the retaining wire. The air flow module may include an air mover and may have an air inlet opening and an air outlet opening. The shaped body may have at least one air through-hole extending from the seating surface to the air flow module. The air flow module may be in fluid communication with the at least one air through-hole in the shaped body. At least one channel may extend in a radial direction and adjacent the lower surface of the shaped body, the air flow module being in fluid communication with the at least one channel.

Each of the at least one channel may be one of a groove formed in the lower side of the shaped body, a passageway defined by the lower side of the shaped body and contours in a support surface of the shaped body, and a groove formed in the lower side of the shaped body in combination with contours in a support surface of the shaped body. The contours in the support surface of the shaped body may include one or more of technological voids, grooves, and orifices formed in the support surface.

These and other features and advantages of the invention will be more fully understood from the following detailed description of the invention taken together with the accompanying drawings.

BRIEF DESCRIPTION OF THE DRAWINGS

In the drawings:

FIG. 7 is a perspective view of yet another air mover assembly in accordance with the present invention;

FIG. 8 is an exploded view of a seat ventilation arrangement in accordance with the present invention including the air mover assembly of FIG. 7;

DETAILED DESCRIPTION OF THE INVENTION

Figure 1:
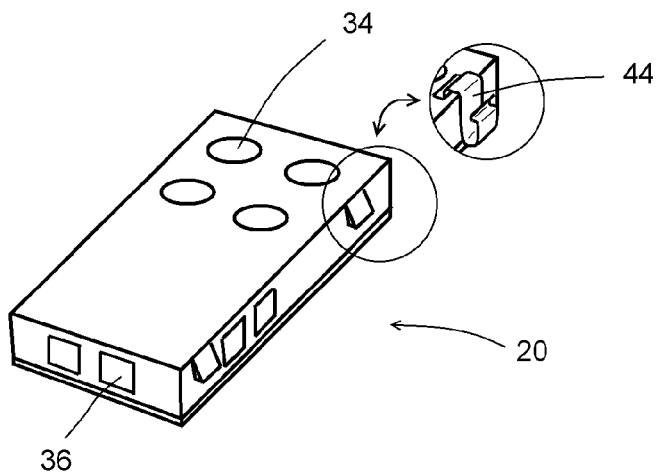
FIG. 1 is a perspective view of an air mover assembly in accordance with the present invention.

FIGS. 1-9 illustrate three examples from a broad variety of air mover configurations 20, 20' in accordance with the invention, and the manner in which they work. The common features of these embodiments are having intake and output ports 34, 36. The intake ports 34 are located on the unit side oriented towards the occupant and these ports are aligned with vents 48 in the foam leading to the seat-occupant interface. The output ports 36 (or output "zone") are located sufficiently peripherally and fluidly connected to grooves 46 or imperfections on the foam pad 22 surface able to route the air towards the seat bulk or seat peripheral zone, preventing the output ports from being blocked by the foam.

FIGS. 1-3 and 14-15 show a "boxy" style air mover or conditioner in accordance with the invention having two compartments or manifolds 38, 40 and at least one blower or radial fan 30 that pumps the air from one compartment to another. The manifolds 38, 40 are mutually arranged in a "planar" manner, side-by-side, and the air blower 30 pumps the air from one manifold into another.

An air conditioning unit in accordance with the invention therefore may have the following features:

A shaped body forming at least one part of a vehicle or furniture seat cushion (e.g., the shaped body being the foam body of a seat structure), wherein the shaped body has a seating surface (A-side) that faces an occupant of the seat and an opposite lower side (B-side) that faces away from an occupant of the seat, and an air conditioning module that is arranged at the lower side of the shaped body, wherein the air conditioning module has at least one blower (preferably a radial fan) each including a blower housing with an axial air inlet opening and a radial air outlet opening, and wherein the shaped body has at least one air through-hole extending from the seating surface to the air conditioning module.

The air conditioning module comprises at least one air inlet compartment and at least one air outlet compartment, wherein each said compartment has a bottom surface, a top surface and side walls, and wherein the compartments are separated from each other by a partition wall that is formed at a location of the side walls. The at least one blower fan is mounted in the air conditioning module such that the blower housing is in fluid communication with at least one opening in the partition wall, the blower fan drawing air from the air inlet compartment and emitting the air to the air outlet compartment via the radial air outlet opening. At least one opening in the top surface of the air inlet compartment is in fluid communication with the at least one air through-hole in the shaped body. At least one channel extends in a radial direction and is in fluid communication with the air conditioning module, wherein the air drawn into the air conditioning module from the through-holes in the shaped body is injected into the at least one channel.

Figure 3A:
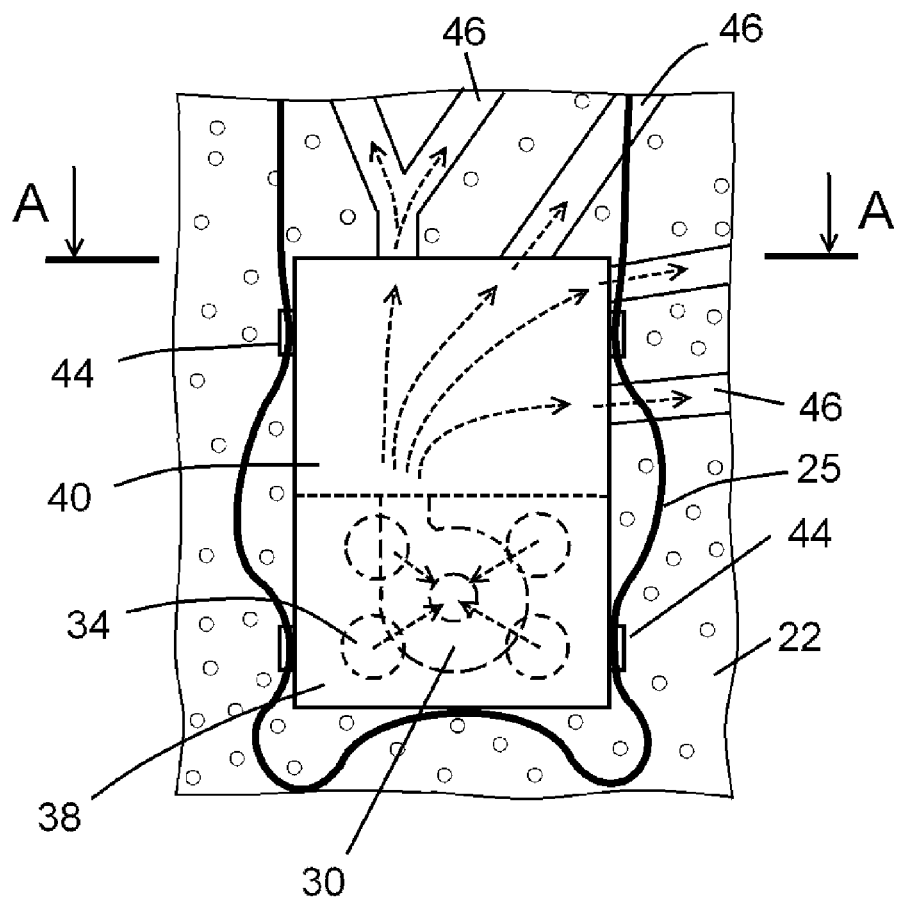
FIGS. 3A and 3B are cross-sectional views of the seat ventilation arrangement of FIG. 2.
Figure 3B:
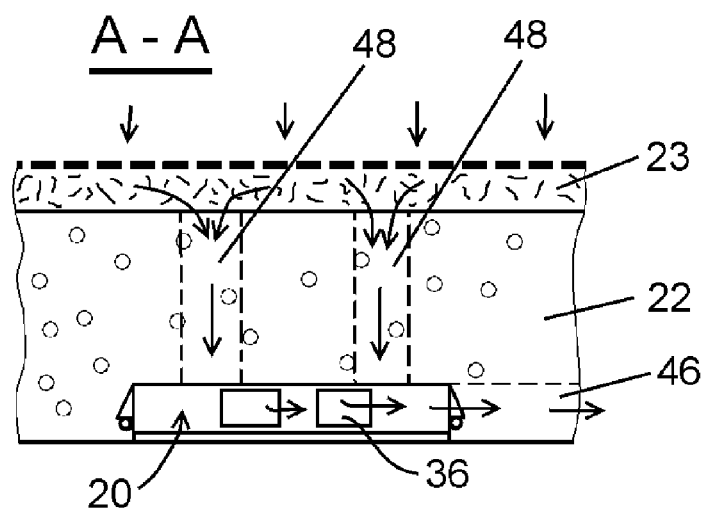
Figure 14:
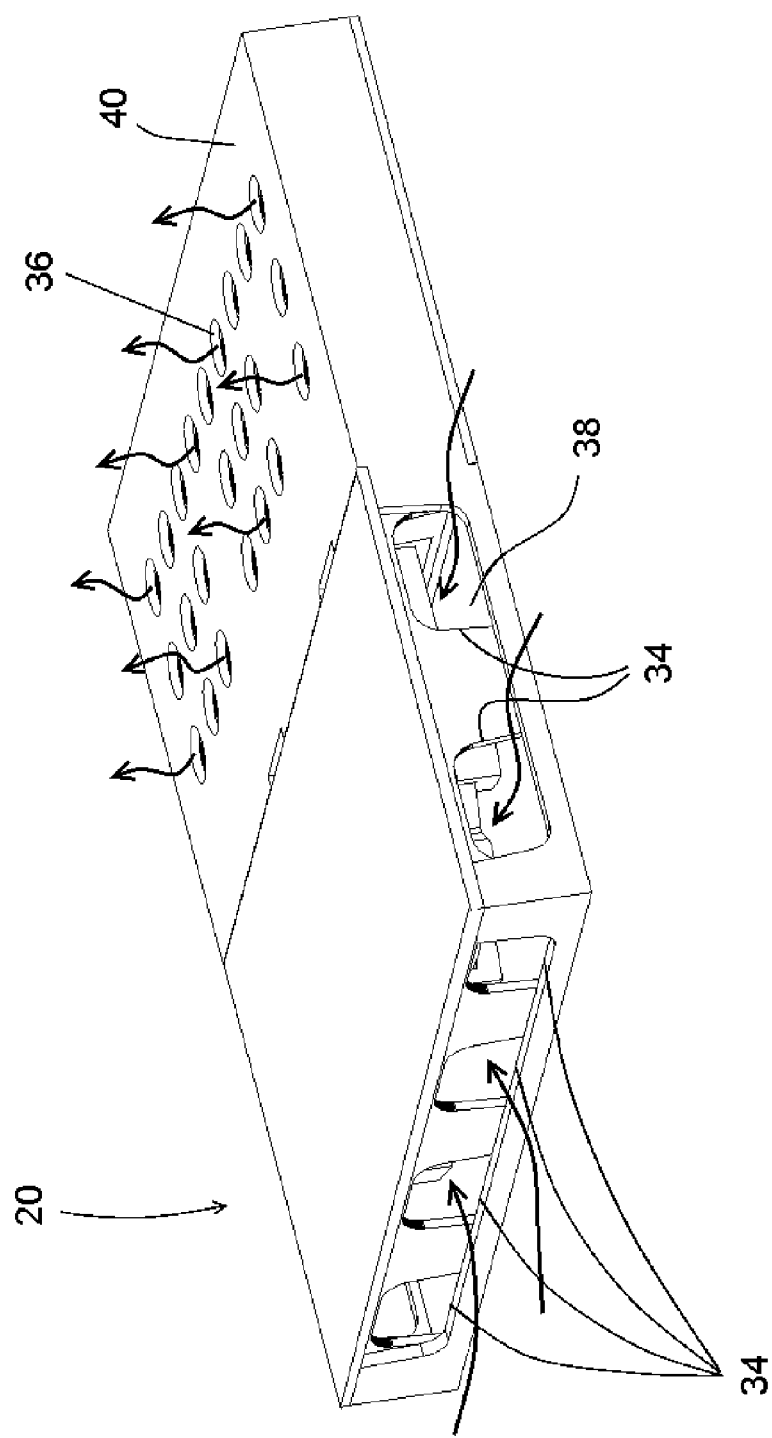
FIG. 14 is a perspective view of an air mover assembly in accordance with the present invention.
Figure 15:
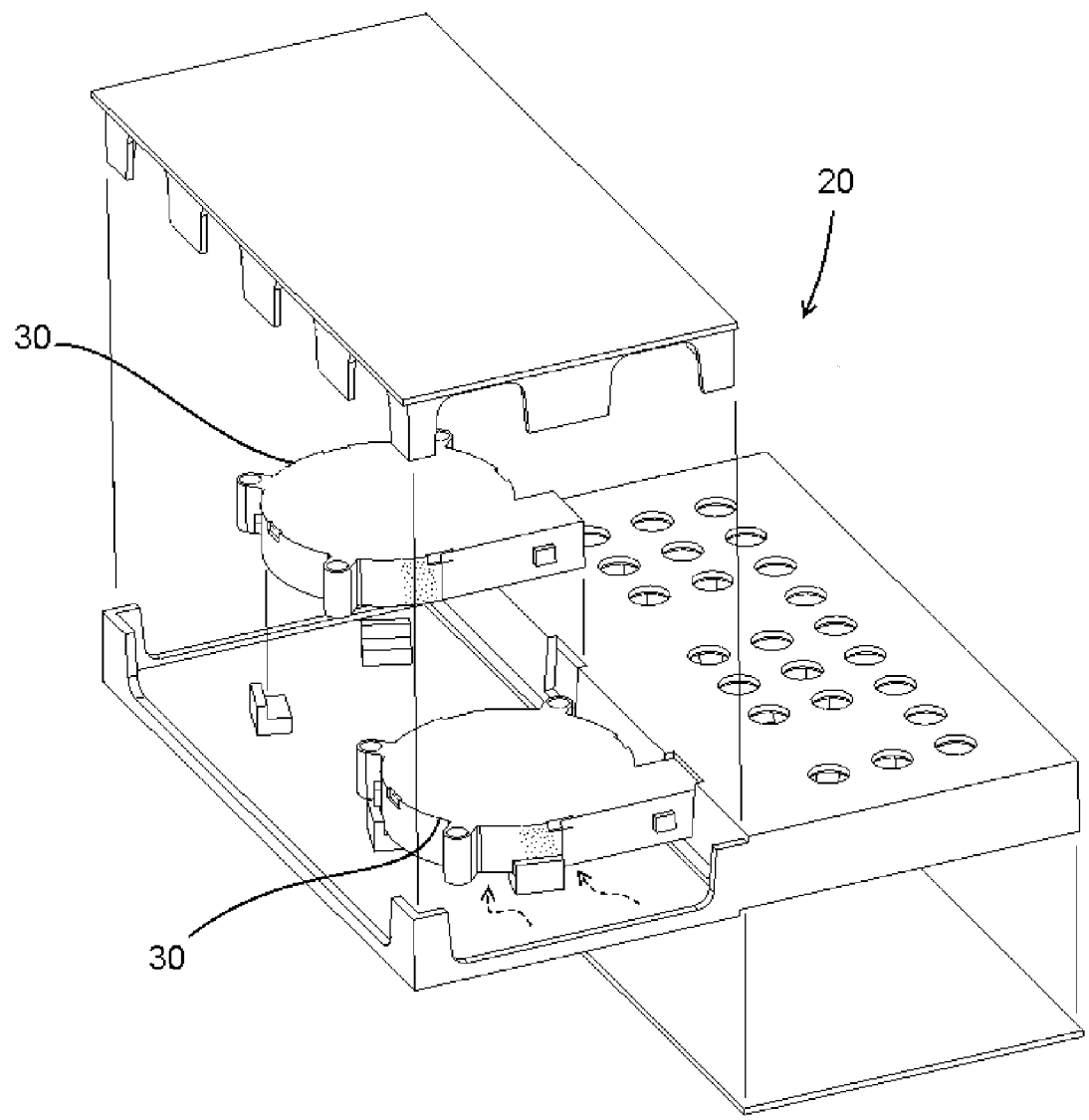
FIG. 15 is an exploded view of the air mover assembly of FIG. 14.

In a similar embodiment as that shown in FIGS. 14-15, the arrangement may be designed as a pull-system. Such a system is shown in FIGS. 3 and 6.

Figures 4, 5:
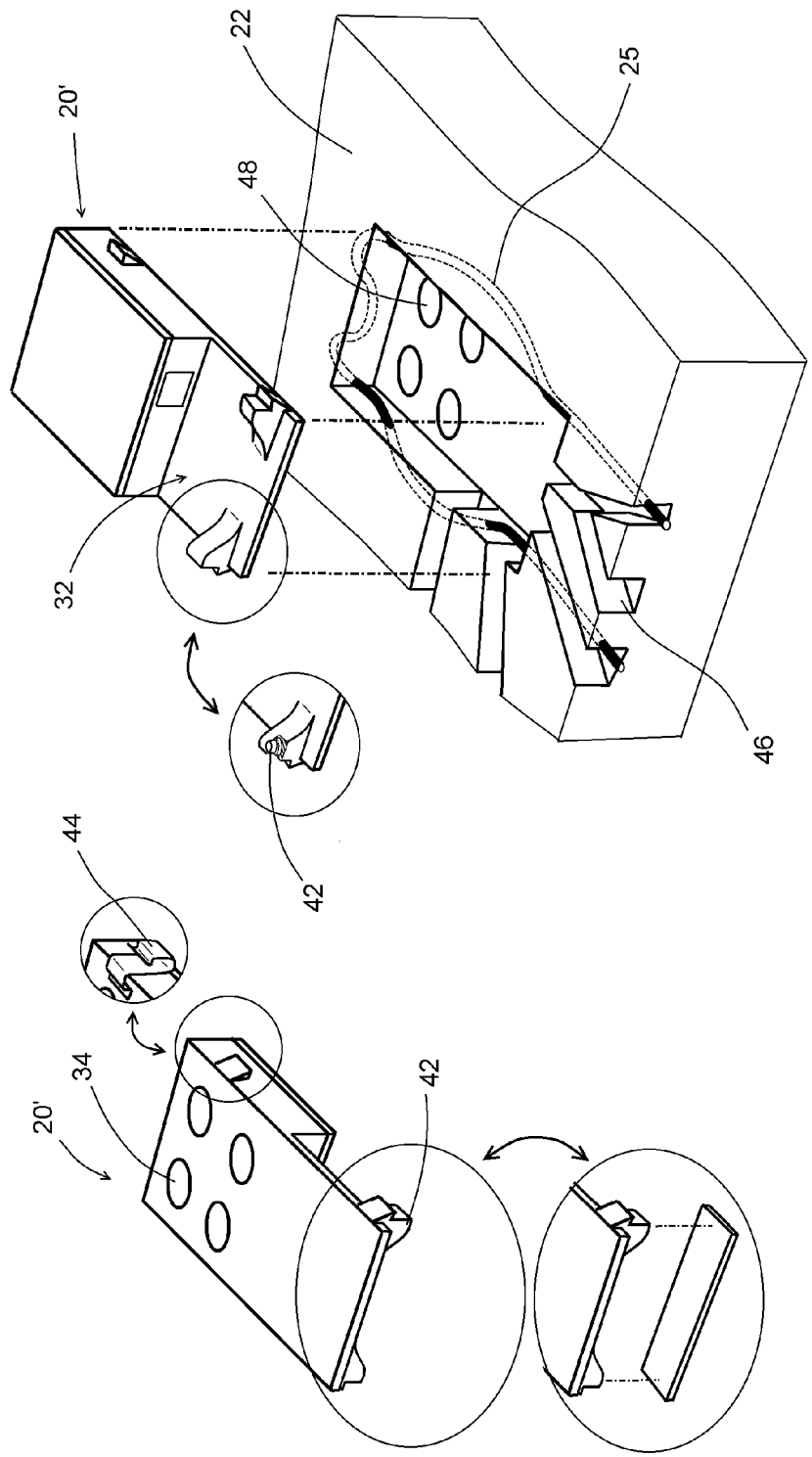
FIG. 4 is a perspective view of another air mover assembly in accordance with the present invention.
FIG. 5 is an exploded view of a seat ventilation arrangement in accordance with the present invention including the air mover assembly of FIG. 4.
Figure 6A:
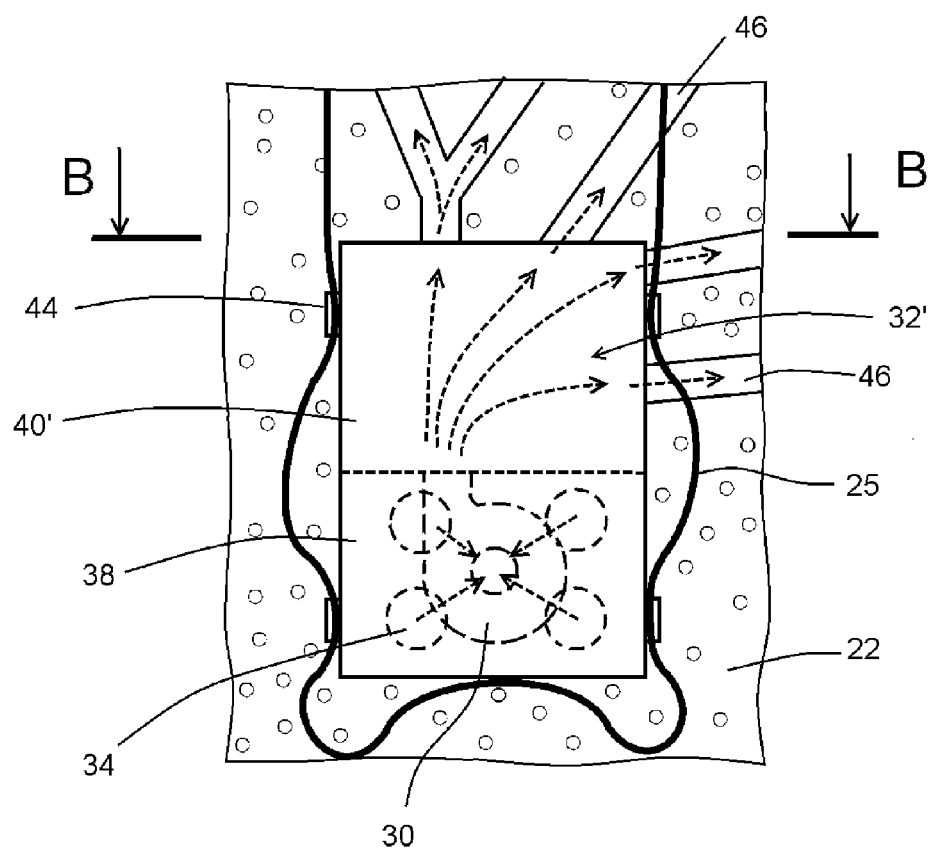
FIGS. 6A and 6B are cross-sectional views of the seat ventilation arrangement of FIG. 5.
Figure 6B:
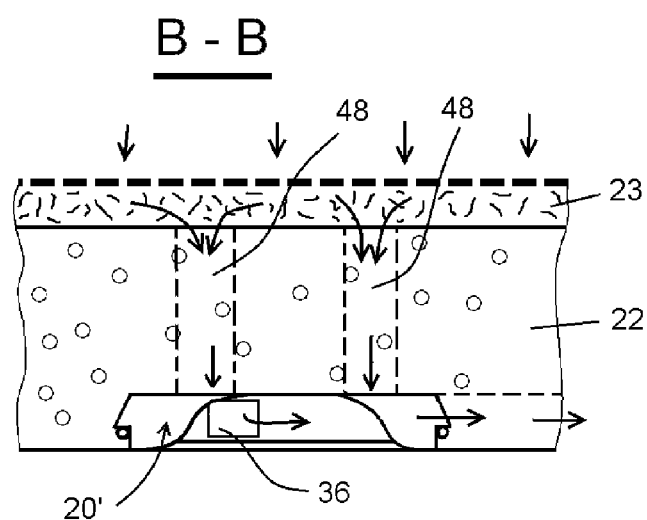

FIGS. 4-6 show an air mover 20' with one "boxy" intake manifold 38 and a deflector with studs or "legs" 42 representing the output manifold 40' when it is connected to the base 22 surface. This is also a planar arrangement, and the intake manifold 38 is located side-by-side with the output manifold/deflector 40'.

Figure 9A:
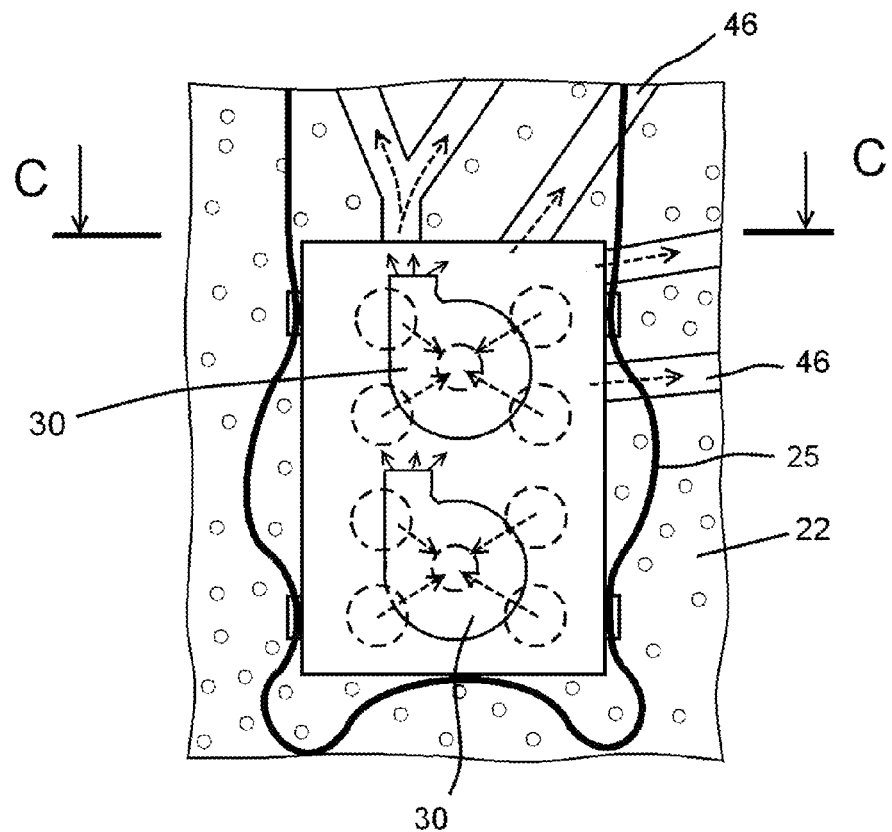
FIGS. 9A and 9B are cross-sectional views of the seat ventilation arrangement of FIG. 8.
Figure 9B:
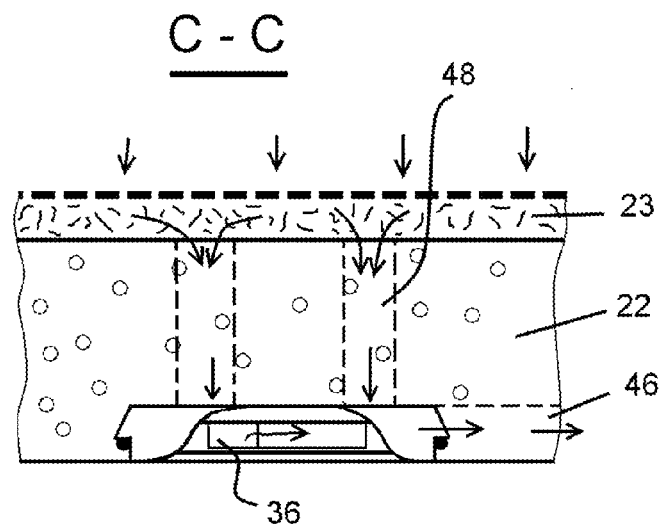

FIGS. 7-9 show a "vertical" arrangement in which the intake manifold is located over the output manifold/deflector and blowers or fans 30 are "hung" on a lower surface 26 of the intake manifold between its distancing studs or "legs" 42.

Figure 10:
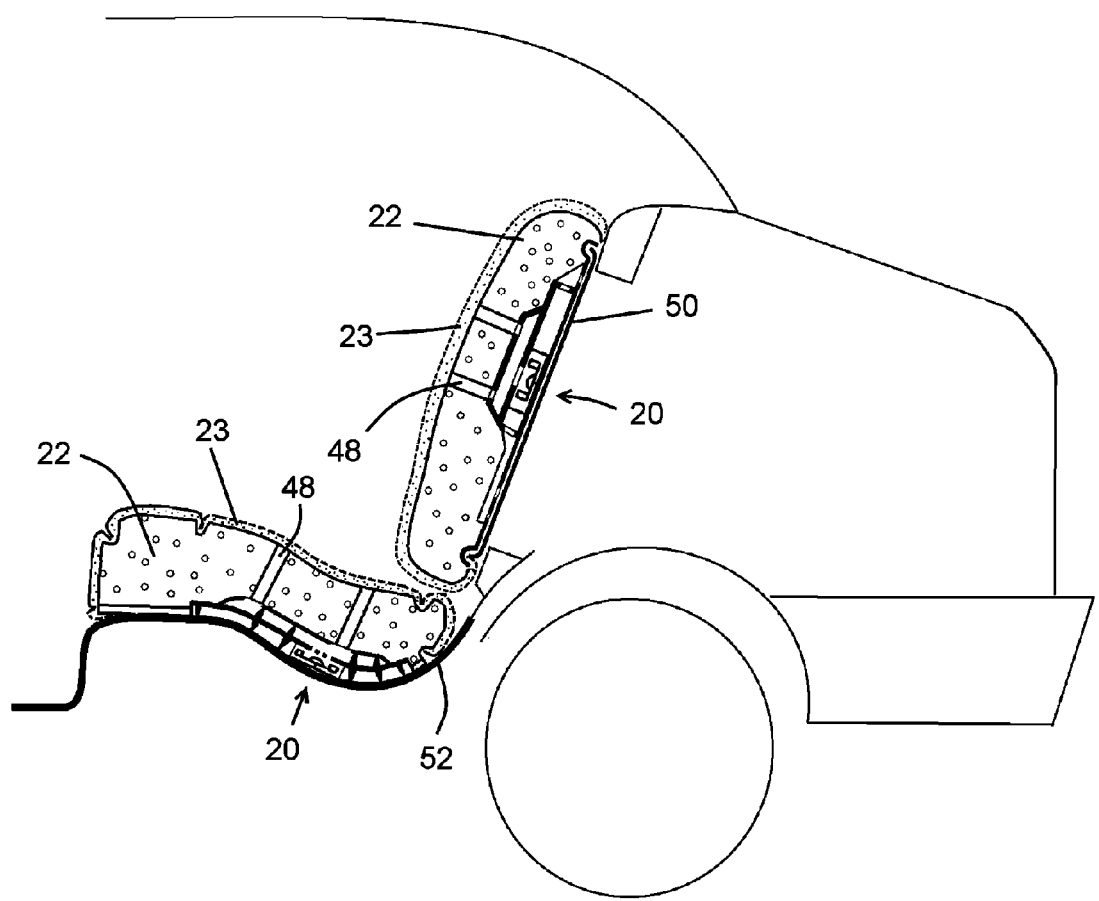
FIG. 10 is a cross-sectional view of a seat ventilation arrangement in accordance with the present invention arranged in a vehicle rear seat assembly.
Figure 11:
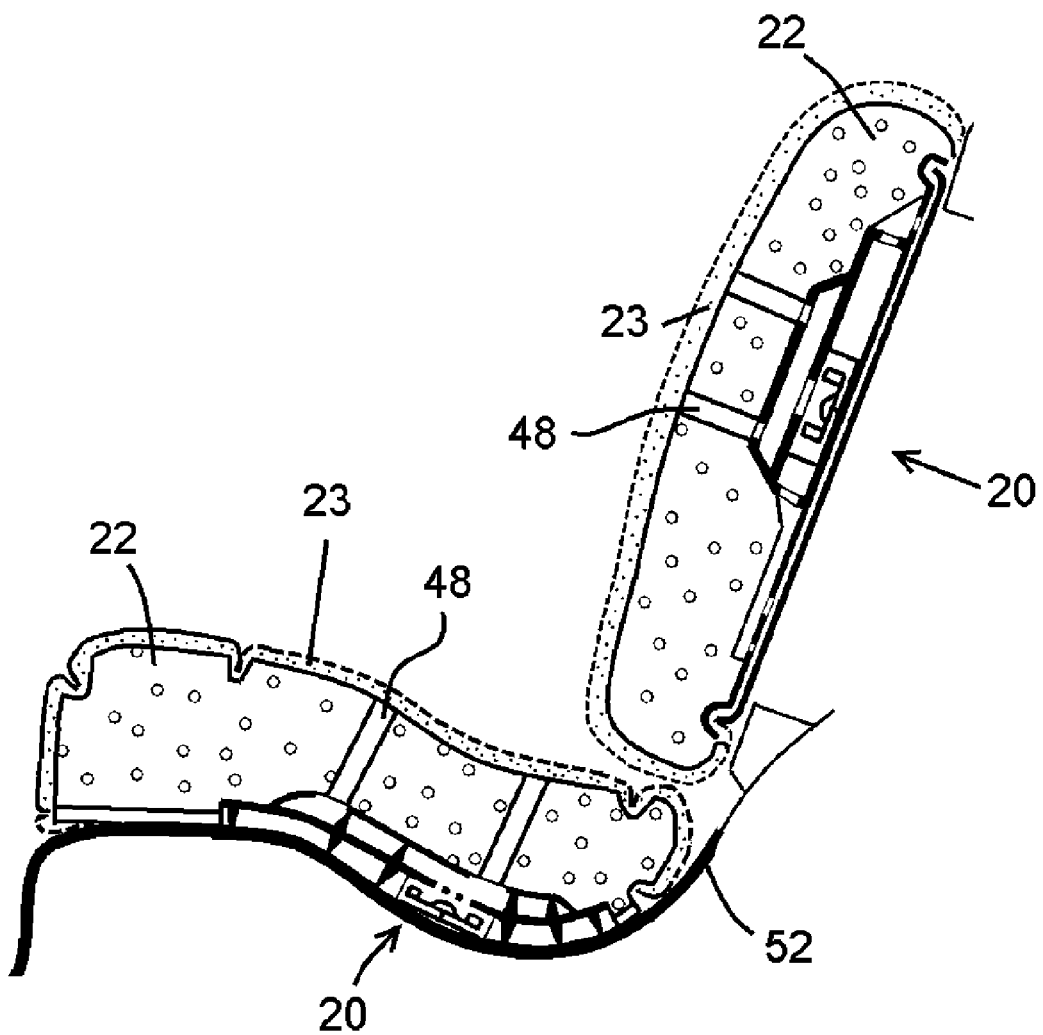
FIG. 11 is an enlarged view of the seat ventilation arrangement of FIG. 10.
Figure 12:
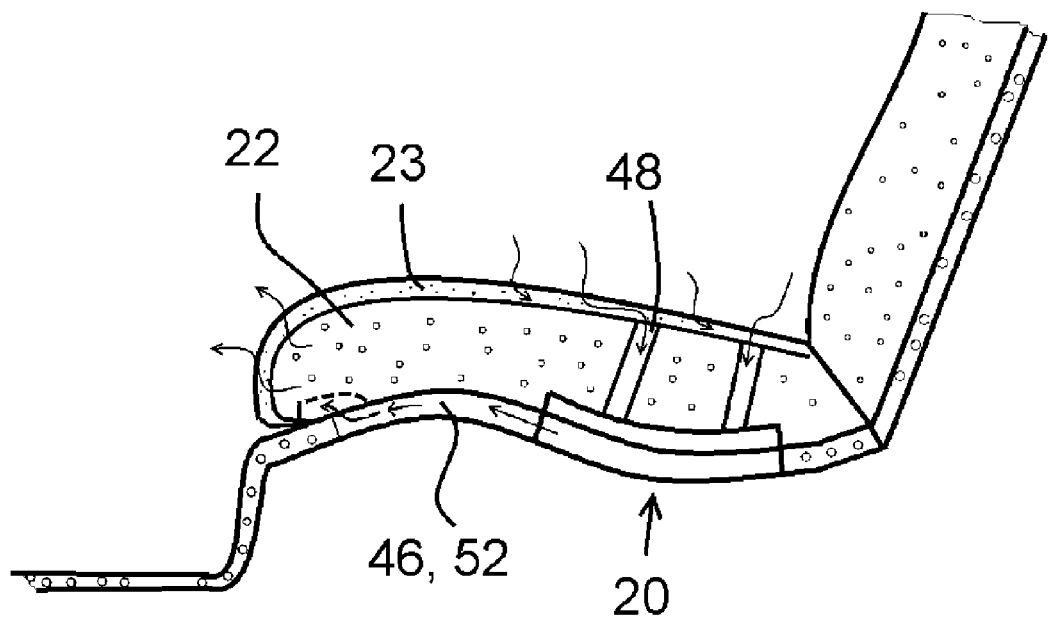
FIG. 12 is a schematic view of air flow through a seat cushion including a seat ventilation arrangement in accordance with the present invention.
Figure 13:
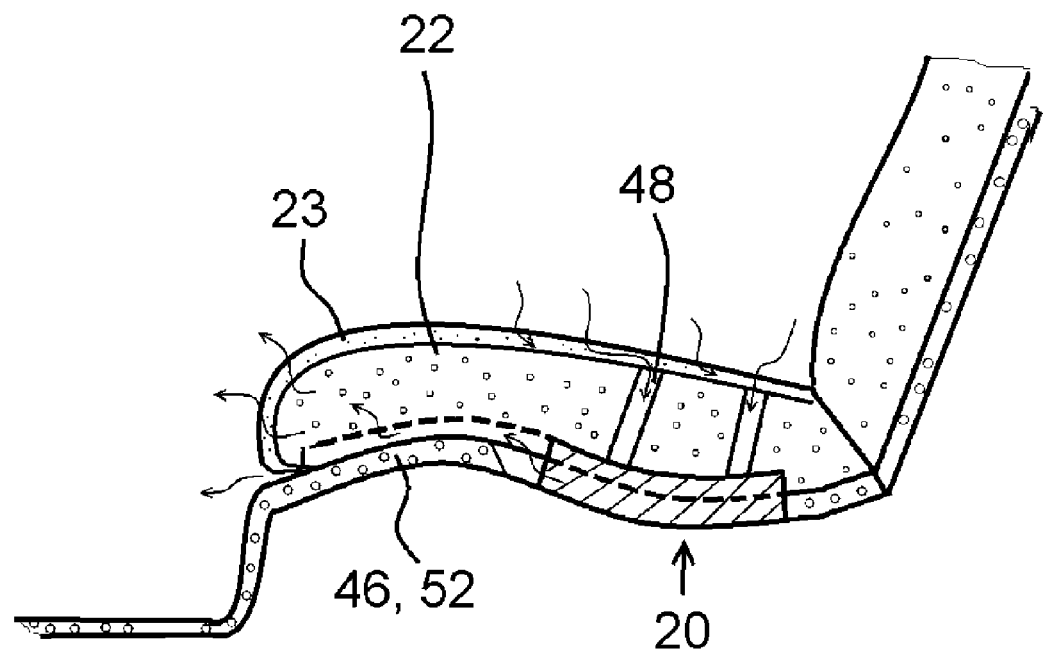
FIG. 13 is a schematic view of air flow through a seat cushion including another seat ventilation arrangement in accordance with the present invention.
Figure 16:
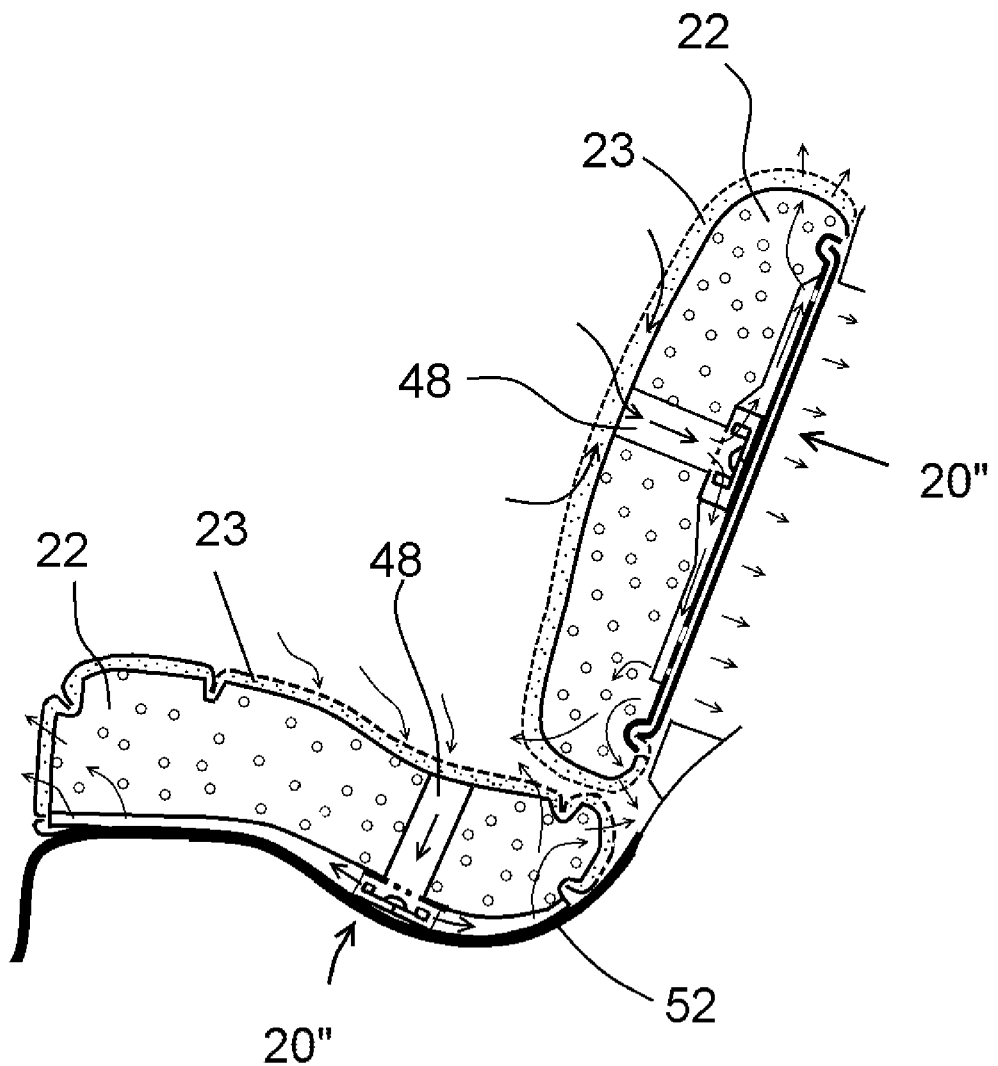
FIG. 16 is a cross-sectional view of a seat ventilation arrangement in accordance with the present invention including an air mover assembly in a vehicle rear seat assembly.

FIGS. 10-11 show cross-sectional views of a vehicle rear seat assembly. FIGS. 12-13 are schematic illustrations of air flow through a seat cushion. FIG. 16 is an extremely simplified embodiment illustrating a conventional air mover presented as a classical manifold-less blower with traditional finger guard. Although there are no manifolds at the intake and the exhaust, this embodiment is still within the scope of the invention: the air mover rests upon the solid base surface, its intake opening is on the air mover side facing the foam pad opening, it discharges air through an air mover feature located on its periphery (spout or more than one spout), there are no breathing ports on the seat surface but there are some grooves allowing the discharged air to disperse into the foam/base surface interface and "seep" through the seat imperfections, sewed seams, foam itself, and voids in the base surface welding or other minor technological openings. Arrows show the air possible route through the seat when in operation. Air pulled by the blower enters the air permeable seat trim first, moves through the vent in the foam pad to the air mover, and gets discharged by the air mover into at least a single groove routing it away from the air mover where the air may disperse. Some fraction of the air still may be pulled back into air mover through the foam but it does not affect the seat ventilating function significantly. In a prototype seat, such airflow was reaching 7 CFM in the occupied rear bench type seat back, per one passenger. The air was found escaping all around the seat and it was captured by wrapping the whole seat surface except the zone occupied by the test person.

The air mover may be pressed to the vehicle base by the seat or occupant weight, or may be attached by various other means.

To accomplish a chatter-free magnetic attachment to a typical ferromagnetic vehicle body, the air mover side contacting the solid base may be made magnetic by incorporating magnets into the side, "legs", or by overmolding the side with magnetic plastic or by adhering the air mover with magnetic tape. In an extreme case, the whole air mover or parts thereof may be made of a magnetic material.

Figure 2:
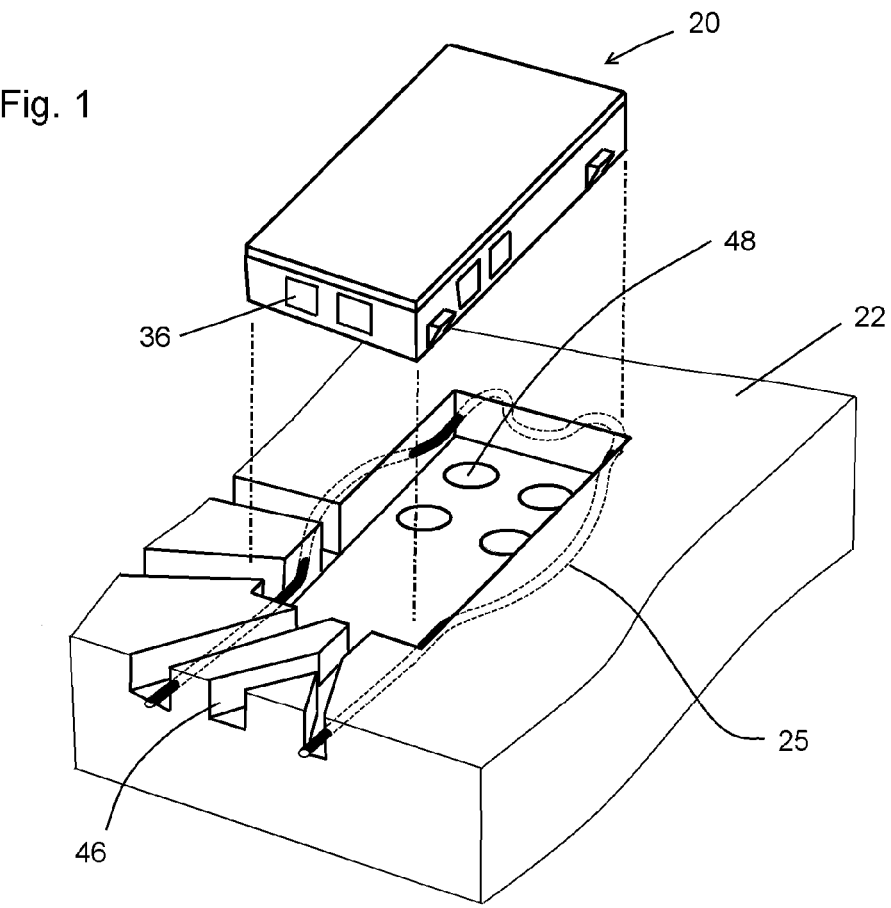
FIG. 2 is an exploded view of a seat ventilation arrangement in accordance with the present invention including the air mover assembly of FIG. 1.

Various magnetic features are shown in FIGS. 1-3, in which the layer facing the base surface may be magnetic. FIG. 4 shows a bridge connecting two "legs", and in FIG. 5, an overmolded magnet is inside the "leg".

The air mover solid base side may be generally flush with the foam pad surface that faces the seat solid impermeable base or a protective layer installed on the base surface. However, if that same base surface is lined with some thermal, vibration, or a sound insulating layer, i.e. carpet, foam, etc., such layer may need a void in the air mover location allowing the air mover to rest on the base solid surface or be attached to it as shown in the FIGS. 12 and 13. Such an attachment may be accomplished by fasteners, clips, adhesive, magnetic forces, Velcro™, etc. If the insulation layer thickness is comparable with the air mover height (or thickness) such as ¼, ⅓, etc., or it is equal or exceeds the air mover height, then the air channels may be partially or fully made in this layer. Alternatively, the layer must be arranged to allow air discharged from the air mover to enter the grooves in the foam pad.

In one embodiment, the lower side (B-side) of the foam pad 22 includes a recess having a sidewall extending from the lower side, and a retaining wire such as a reinforcing metal wire 25 may be disposed in the foam pad between the seating surface and the lower side and partially extending through the sidewall into the recess. The foam pad reinforcing metal wire 25 is adapted to hold the air mover to the foam pad and restrain it in a direction parallel to the base surface when the foam pad or the whole seat is placed into the vehicle. This attachment is illustrated in FIGS. 2, 3A, 5, 6A, 8, and 9A. If the seat cushion is removed from the vehicle the air mover stays attached to the detached cushion piece by connectors such as snap-in hooks or clips 44 shown in these illustrations. In an exemplary vehicle embodiment, this attachment is applicable to the seat back and takes into consideration that the seat back solid base is inside the foldable seat back.

The air mover alternatively may be permanently attached to the seat back metal shell and the foam pad would then be placed over it during seat back manufacturing.

The air mover side facing the base surface comes in touch with the base surface and is retained as described herein above. Since the vehicle body is commonly made of a ferromagnetic material (steel), the magnetic tape or magnetic plastic layer or several individual magnets may be attached or imbedded into the air mover side facing the base surface. Those magnets may maintain a zero gap between the air mover and the base surface. Magnetic attachment is beneficial for air mover vibration reduction, the vibration being felt by the seat occupant. Hook-and-loop fasteners (Velcro™) provide a good fastening solution, because like the magnetic attachment it is also "forgiving" to the assembly misalignment, and it is less capable of limiting air mover vibration displacement.

In embodiments including the insulation foam layer on the base surface and the air mover contacting the base surface, the air mover must be partially received in this layer void, and the rest of the air mover part rising over the layer is received by the foam pad indent. If the base surface is covered with a sufficient thickness of anti-corrosion polymer layer, it may include a void in the polymer layer that is in the air mover attachment zone.

In an extreme case, the insulation layer thickness may equal or exceed the air mover thickness. Then the air discharge grooves in the seat pad described herein may be arranged in that layer, or the layer void shape may be adapted to allow the air to enter into discharge grooves made in the main foam pad.

The foam pad may be modified with surface grooves 46 routed toward the seat pad periphery. When the foam pad is in normal use, the grooves' open side faces the seat air impermeable base structure, and passages created by the grooves allow the air mover discharge air to be directed towards the seat pad periphery where it may be discharged through the seat trim cover peripheral zones, foam pad itself, seat trim sewed seams and various imperfections in the foam pad/vehicle structure interface. These grooves render the system operable even if they do not finish as distinctive openings into the vehicle compartment or cabin or trunk air.

Suitable size fans and blowers 30 are used as the main component of the air mover feature. The exemplary maximum airflow is specified as 11, 16, 30 or more cubic feet per minute (CFM), which are significant values. The climate seat industry inherited the standard engineering approach of the ventilation industry. In this industry, two basic fundamentals are noticeable in many publications: 1) The air flow passage cross-section is linked to the fan or a blower air passage area; and 2) Known tradition is that the air discharge port size must be comparable with the air duct or the adjacent air mover size. The result of the "traditional ventilation culture" is prior art ventilated seats having distinctive air breathing passages and air breathing ports that are arranged so that the seat leather cover voids are less than the fan or blower size. One example is a seat back having vents on a rear surface. Such a discharge (or suction) breathing port is very difficult to arrange on the seat because of ergonomic and aesthetic considerations—especially on a sedan rear seat having an entirely exposed surface that is soft and touchable by the occupant body.

Our discovery is that typical ventilated seat hydraulic resistance is rather large in the occupied condition and that even seats perceived as very well ventilated have very small actual airflow. For example, an existing front seat that is occupied by a 95 kg male shows 2.73 CFM flow in a cushion. This flow is created by four fans working in parallel. This is just 0.68 CFM per fan. Subsequently, the air breathing passage cross-section does not need to be comparable to the fan size; it can be much narrower to conduct 0.68 CFM with no significant contribution to the seat total resistance.

The same fan shows 11 CFM maximum flow when run alone on a test bench. To provide this flow, the fan entry and exit must not be obstructed at all. In other words, the air in a typical, conventional ventilated seat flows similarly to water flowing through two valves sequentially. One valve (the occupant blocking the flow) is cracked open. The second valve (the breathing passage) does not influence the water flow, whether it is fully open or half-open or a quarter-open. The limited water flow therefore may be discharged through a much narrower pipe and larger obstruction without a problem.

Working on a new ventilated rear seat design for a large vehicle, we achieved satisfactory performance even though the visually non-breathable seat trim had no breathing port. The seat imperfections, air filtration through "unventilated leather zones", technological openings in the seat cover allow enough air breathing capability, and sometimes internal solid structure is air permeable and allows the seat to breath by its full surface area. However, a necessary feature for this is at least one duct in the foam pad surface facing the solid base surface directed towards the seat peripheral zone. Of course, discharge ports in the seat trim towards the cabin air would facilitate the airflow and contribute somewhat to the performance, but even without such ports the ventilation system is quite functional.

Little performance is lost if there is no discharge port. In our tests on an occupied seat, the pressure drop on a discharge route contributed no more than 25% of the seat total resistance. If this discharge component is eliminated, then the air mover wants to pump more air. It causes the air mover total pressure to decrease and the occupant/seat interface resistance to increase. These factors restrain the air mover function useful response.

On a typical foldable seat back rear side, the sheet metal shell is covered with a relatively stiff compressed felt layer. This felt layer has guaranteed air permeability. The sheet metal shell may have technological holes and they may allow the felt to contribute into the seat back air discharge capability. In the seat back shell illustrated in FIGS. 10 and 11, technological holes, felt, and grooves are shown. Routing the grooves in the foam over these openings facilitates air flow and system performance.

After implementing the invention in the seat back, the air discharged from the air mover pressurizes the whole seat back and leaks through all possible pores. The air also is routed to the seat back periphery, through the foam/metal interface imperfection, through intently made grooves in the foam pad rear side that faces the metal shell, and also through voids in-between the seat foam pad and the sheet metal shell reinforcing channels welded to the shell. It is preferable that the grooves in the foam are routed over the technological openings so the air could enter the space between the shell and the felt, and the felt permeability easy allows for the seat back air discharge.

The air mover design details require it to have a relatively flat shape and the suction ports to be located sufficiently on its larger side oriented towards the foam pad.

The operation of the present invention is as follows. The air mover 30 pulls the air from a suction layer or a suction manifold. This layer/manifold communicates fluidly with the air permeable seat trim cover layer 23 occupied by the seat occupant. The air mover 30 pushes the air towards grooves 46 made on the foam pad surface 22 facing the seat solid support surface. The air moves towards the extensive seat peripheral zone 32 where it is dispersed through pores and other imperfections of the seat support/foam interface. The air flow direction may be reversed from a pull system described herein toward a push system maintaining all functionality of the invention. In this case all terms like input/output, suction/discharge, suction side/discharge, and side/manifolds may be interchanged. While the description of the invention above was made with reference to a pull system, it should be understood that the present invention may function as a push system that is merely the opposite in air flow direction relative to the described pull system. An example of a "pull type" air mover is illustrated in the drawings.

In the present invention as described herein, the "top" manifold or the one facing the seat foam pad may be made as an empty cavity. In previous embodiments, one of two manifolds were made of a spacer material whose "meat to metal" minimum distance cannot be met without making this manifold compressible.

In the present invention, using grooves on the seat B-surface makes the seat virtually "discharge port free". Of course, some discharge ports clearly open into the cabin air and are desirable to improve the function somewhat but they are not critical for the performance. At the same time, a unique property of foam is employed: its non-linear function for compression. While the foam top zone collapses under the occupant hip bone extremities, the force "footprint" area increases with depth. Grooves occupying up to one quarter of the surface on the foam "B-side" do not experience collapsing pressure and continue to be functional. Foam wire reinforcement is used for planar positioning only and to retain the air mover attached to the seat foam pad if the seat cushion needs to be removed. A magnetic or Velcro attachment secures contact to the base surface, forgives the foam pad and seat installation positional tolerance, and forgives the foam minor shift under unusual force from the seat occupant or cargo. These two combined attachments eliminate the risk of the air mover chattering when the seat is unoccupied or the air mover is turned on by an accident and a bumpy road makes it jump. The present invention allows for the elimination of the air discharge port if it is not desirable by ergonomics or aesthetic considerations, with little to no loss in performance. However, a limited number of discharge vents may be added if desired.

The following are essential features of the present invention which provide a useful effect when applied together: 1) Air permeable seat cover or seat trim which the seat occupant sits on or leans on; 2) Seat foam pad being in contact with a solid air impermeable base surface on a side away from the occupant side; 3) Air mover being located sufficiently in the foam pad/impermeable base surface interface; 4) Vents in the seat foam pad connecting the air permeable trim with either the intake or discharge air mover port(s) on the air mover, or the foam being made air permeable; and 5) At least one groove in the foam being arranged on the seat pad foam side mating the solid air impermeable base surface and routed from the output (or intake) port(s) toward the seat bulk and/or periphery and preventing the air mover "choking" in a zone adjacent to the air mover.

The following are additional features that facilitate the ventilated function and vibration comfort of the present invention: 1) The air mover attachment to the base surface; 2) Grooves extended fully to the hidden from the eye trim zones (if present) that are either perforated (if possible) or made of air permeable material and 3) Grooves being routed through the base surface technological voids, minor openings, and other technological or intentionally formed orifices.

Although the invention has been described by reference to specific embodiments, it should be understood that numerous changes may be made within the spirit and scope of the inventive concepts described. Accordingly, it is intended that the invention not be limited to the described embodiments, but that it have the full scope defined by the language of the following claims.

What is claimed is:

1. An air conditioning unit comprising:
   a shaped body forming at least one part of a seat cushion, the shaped body having a seating surface that faces an occupant of the seat and a lower side that faces away from an occupant of the seat, and
   an air conditioning module arranged at the lower side of the shaped body,
   the air conditioning module having at least one blower fan each including a blower housing with an axial air inlet opening and a radial air outlet opening,
   the shaped body having at least one air through-hole extending from the seating surface to the air conditioning module,
   characterized in that
   the air conditioning module comprises at least one air inlet compartment and at least one air outlet compartment,
   each said compartment has a bottom surface, a top surface and side walls, and the compartments are separated from each other by a partition wall that is formed at a location of the side walls,
   the at least one blower fan is mounted in the air conditioning module such that the blower housing is in fluid communication with at least one opening in the partition wall, the blower fan drawing air from the air inlet compartment and emitting the air to the air outlet compartment via the radial air outlet opening,
   at least one opening in the top surface of the air inlet compartment that is in fluid communication with the at least one air through-hole in the shaped body, and
   at least one channel that extends in a radial direction and is in fluid communication with the air conditioning module,
   wherein the air drawn into the air conditioning module from the through-holes in the shaped body is injected into the at least one channel.

2. The air conditioning unit of claim 1, wherein the at least one channel is generally parallel to a support surface of the shaped body.

3. The air conditioning unit of claim 1, wherein each of the at least one channel is one of a groove formed in the lower side of the shaped body, a passageway defined by the lower side of the shaped body and contours in a supporrt surface of the shaped body, and a groove formed in the lower side of the shaped body in combination with contours in a support surface of the shaped body.

4. The air conditioning unit of claim 3, wherein the contours in the support surface of the shaped body include one or more of technological voids, grooves, and orifices formed in the support surface.

5. The air conditioning unit of claim 1, wherein the air conditioning module includes a plurality of openings peripherally, radially disposed.

6. The air conditioning unit of claim 5, wherein the plurality of openings are disposed in one or more side walls of the air outlet compartment.

7. The air conditioning unit of claim 5; wherein the plurality of openings are in fluid communication with the at least one channel.

8. An air conditioning unit comprising:
- a shaped body forming at least one part of a seat cushion, the shaped body having a seating surface that faces an occupant of the seat and a lower side that faces away from an occupant of the seat, and the shaped body being supported by a support surface;
- an air conditioning module arranged at the lower side of the shaped body;
- the shaped body having at least one air through-hole extending from the seating surface to the air conditioning module;
- the air conditioning module including an air inlet compartment and an air outlet compartment, each said compartment having a bottom surface, a top surface and side walls, and the compartments being separated from each other by a partition wall that is formed at a location of the side walls, each partition wall including at least one opening therein;
- the air conditioning module including at least one air mover, each air mover having a housing with an axial air inlet opening and a radial air outlet opening, and each air mover being mounted in the air conditioning module such that the axial air inlet opening is in fluid communication with the air inlet compartment and the radial air outlet opening is in fluid communication with the air outlet compartment; and
- at least one channel extending in a radial direction and adjacent the lower surface of the shaped body, and being in fluid communication with the air conditioning module, wherein the at least one air mover provides airflow between the seating surface of the shaped body and the at least one channel.

9. The air conditioning unit of claim 8, wherein the at least one channel is generally parallel to the support surface.

10. The air conditioning unit of claim 8, wherein each of the at least one channel is one of a groove formed in the lower side of the shaped body, a passageway defined by the lower side of the shaped body and contours in the support surface, and a groove formed in the lower side of the shaped body in combination with contours in the support surface.

11. The air conditioning unit of claim 10, wherein the contours in the support surface include one or more of technological voids, grooves, and orifices formed in the support surface.

12. The air conditioning unit of claim 8, wherein the air inlet compartment is connected to the at least one air through-hole in the shaped body, and the air outlet compartment is connected to the at least one channel, such that the air conditioning module draws air from the seating surface to the at least one channel.

13. The air conditioning unit of claim 8, wherein the air inlet compartment is connected to the at least one channel, and the air outlet compartment is connected to the at least one air through-hole in the shaped body, such that the air conditioning module draws air from the at least one channel to the seating surface.

* * * * *